United States Patent [19]
Yamamoto et al.

[11] Patent Number: 5,315,413
[45] Date of Patent: May 24, 1994

[54] COLOR IMAGE CORRECTION DEVICE FOR CORRECTING PHASE AND RESOLUTION CHARACTERISTICS OF A COPY IMAGE USING DIFFERENT COLOR SIGNAL COMPONENTS

[75] Inventors: Naofumi Yamamoto, Tokyo; Hidekazu Sekizawa, Yokohama, both of Japan

[73] Assignee: Kabushiki Kaisha Toshiba, Kawasaki, Japan

[21] Appl. No.: 907,597

[22] Filed: Jul. 2, 1992

[30] Foreign Application Priority Data

Jul. 4, 1991 [JP] Japan ................. 3-164701

[51] Int. Cl.$^5$ ............................. H04N 1/46
[52] U.S. Cl. ........................ 358/512; 358/514; 358/515; 358/532; 348/253
[58] Field of Search .......... 358/75, 80, 483, 482, 358/494, 51, 514, 532, 515, 504, 512

[56] References Cited

U.S. PATENT DOCUMENTS 4,672,433  6/1987  Yamamoto et al. ............. 358/80
4,837,614  6/1989  Omi .............................. 358/75

FOREIGN PATENT DOCUMENTS 63-302660 12/1988 Japan.
358673   3/1991  Japan.

*Primary Examiner*—Mark R. Powell
*Assistant Examiner*—Scott A. Rogers
*Attorney, Agent, or Firm*—Oblon, Spivak, McClelland, Maier & Neustadt

[57] ABSTRACT

A color image reading and compensating device comprises an image reader including a color image sensor for forming a number of dots arranged in a line, each of the dots being composed of a plurality of pixels corresponding to a plurality of colors, respectively, for outputting a color image signal having a plurality of color signal components for each dot, and a compensating circuit for compensating phase and resolution characteristics of the color image signal, by use of not only one color signal component selected from the color signal components of the color image signal but also the other color signal components, the one color signal component and the other signal components corresponding to a dot of interest and dot in close proximity thereto.

11 Claims, 13 Drawing Sheets

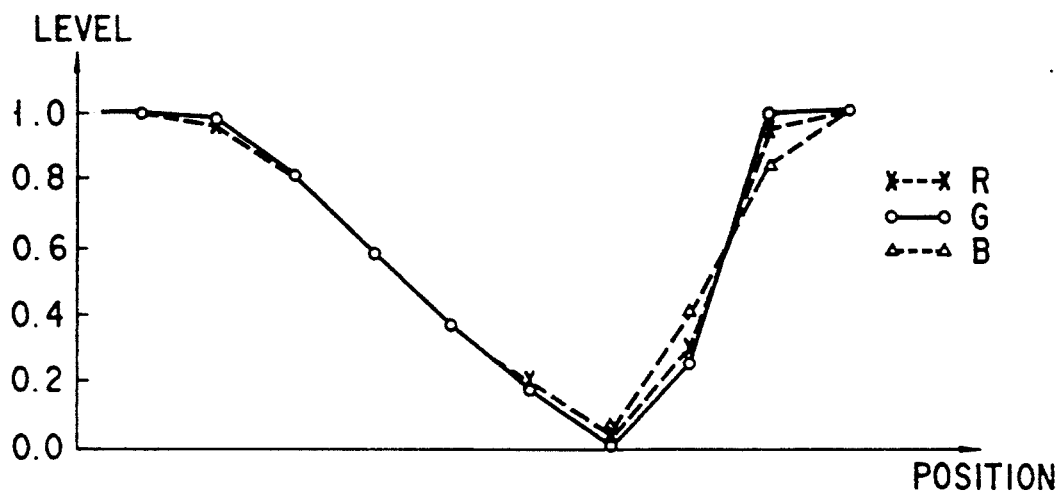
F I G. 5A
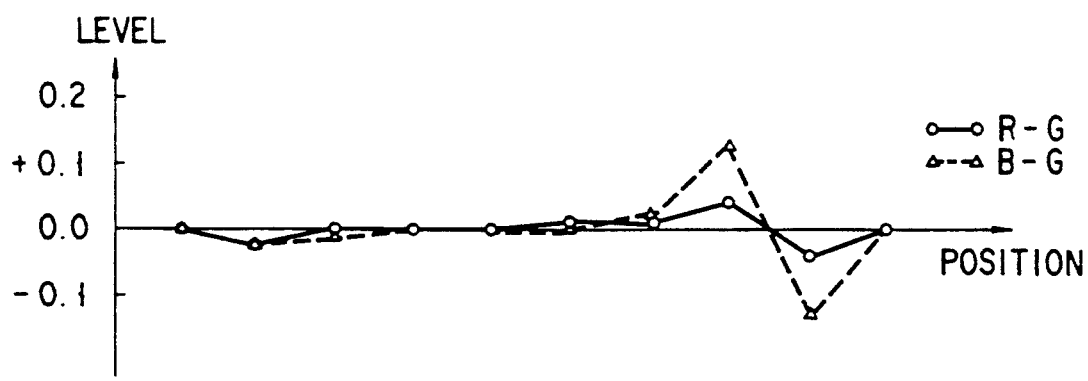
F I G. 5B

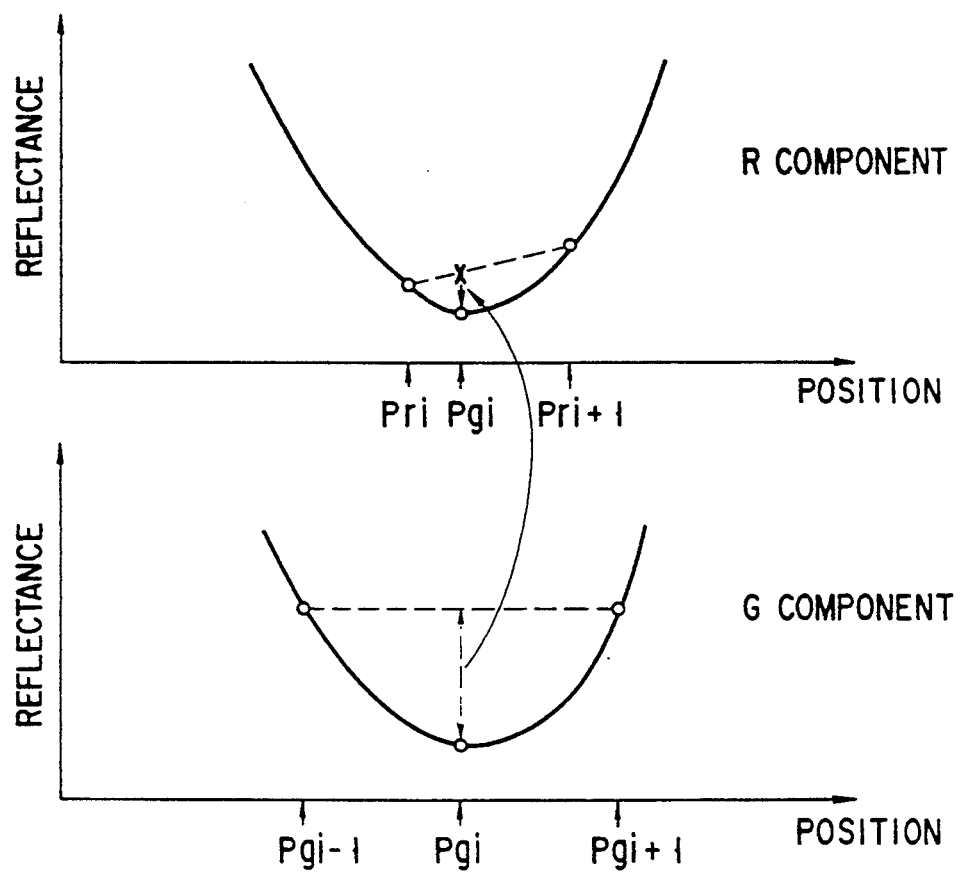
F I G. 6

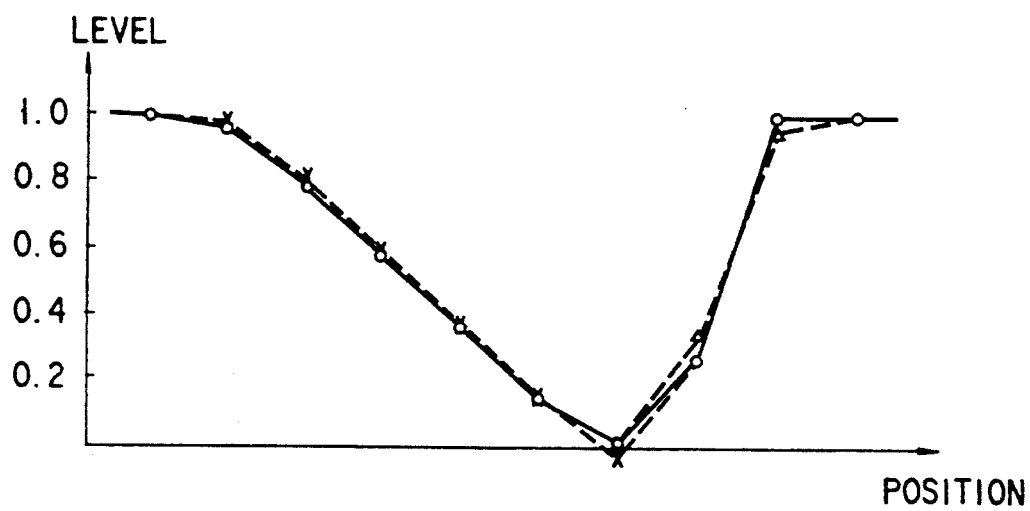
F I G. 7A
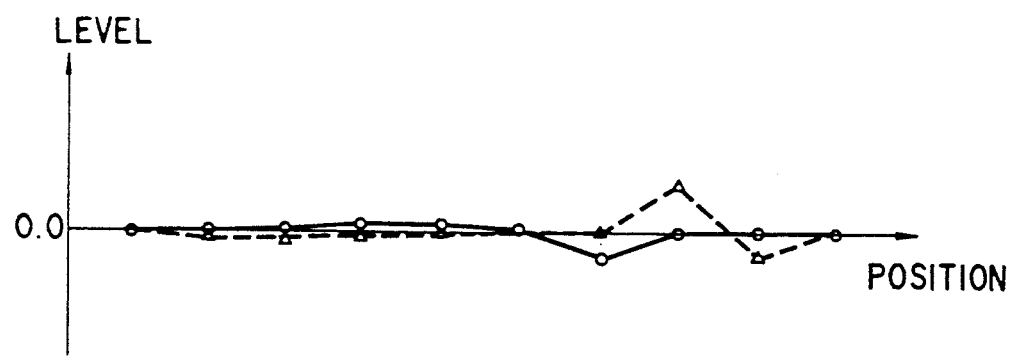
F I G. 7B

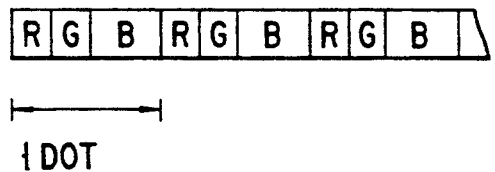
1 DOT
F I G. 12A         F I G. 12B
1 PIXEL
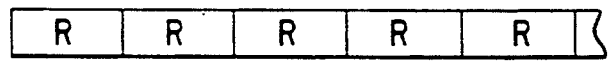
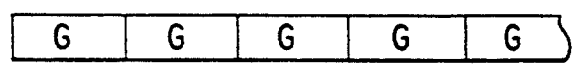
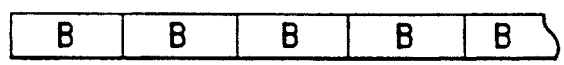
SUB-SCANNING DIRECTION
F I G. 13

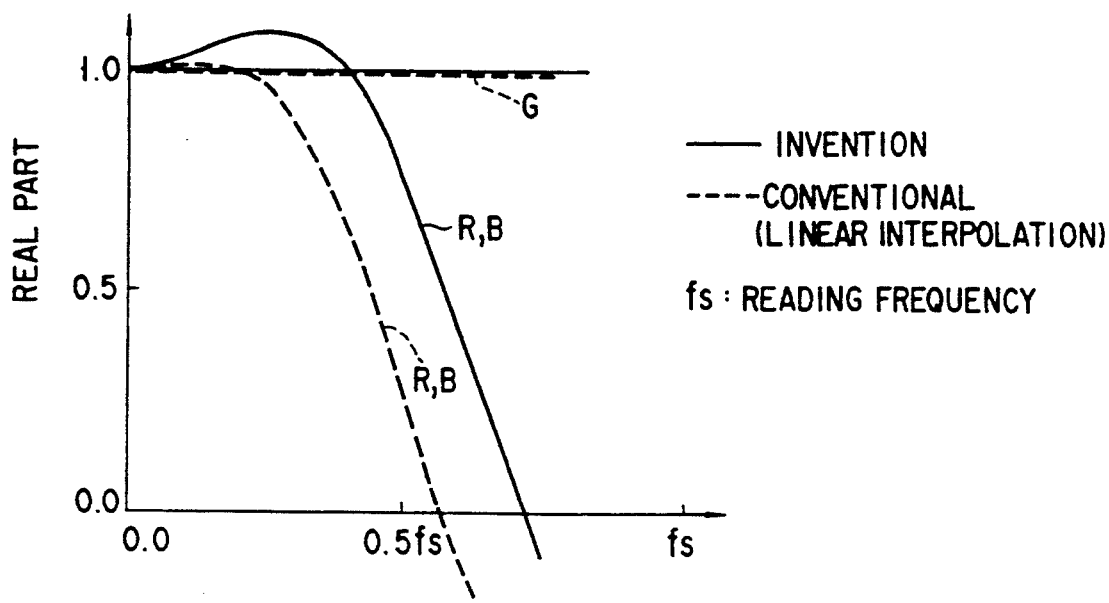
F I G. 14 A
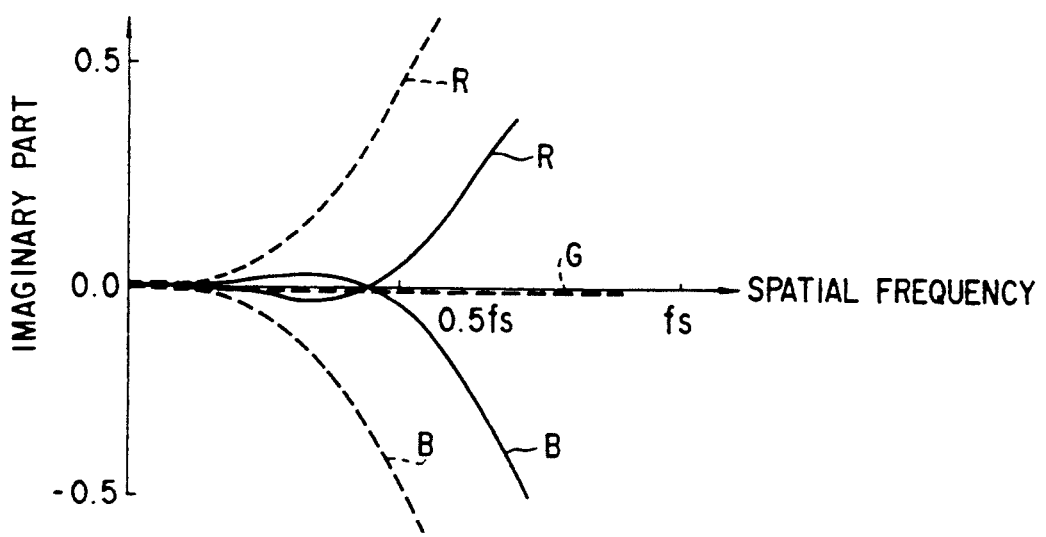
F I G. 14 B

COLOR IMAGE CORRECTION DEVICE FOR CORRECTING PHASE AND RESOLUTION CHARACTERISTICS OF A COPY IMAGE USING DIFFERENT COLOR SIGNAL COMPONENTS

BACKGROUND OF THE INVENTION

1. Field of the Invention

The present invention relates to a color image reading and compensating device which reads images on original documents by using a color image sensor and compensating for differences in phase characteristics and resolution characteristics among resultant color image signals.

2. Description of the Related Art

Color image sensors for reading color images include dot sequential sensors, and linear sensors such as three-line sensors.

A dot sequential image sensor has three color filters, such as R (red), G (green), and B (blue) or Y (yellow), M (magenta), and C (cyan), which are sequentially arranged on a linear array of photosensitive elements, and can read one line of color information by the use of a single image sensor array. With the dot sequential sensor, however, three pixels of R, G, and B, which are placed apart from one another, are considered to form a color dot, and thus hue may vary if there is a brightness gradient in an image. This is referred to as a dot sequential error. This error is not a serious problem in the case of ordinary images. However, the error becomes a serious problem in the case where a high-definition image is read, a read image is enlarged, or a color decision is made for a read image.

To eliminate the dot sequential error, compensating methods using linear interpolation have been proposed and disclosed in Japanese Unexamined Patent Publication No. 61-154357 and U.S. Pat. No. 4,672,433. With this method, the position of an element of a reference color (for example, G) is taken as a reference position, and signals from two pixels of colors (for example, R and B) other than the reference color that sandwich the reference color element are used to estimate the reference color signal on the basis of linear interpolation. Thereby, a dot sequential error in a uniform brightness-gradient portion is corrected, thus eliminating variations in hue.

However, the above method suffers from a problem that lowpass filtering characteristics inherent in the linear interpolation processing will reduce the resolution of signals of two colors other than the reference color. For example, a sine wave response of linear interpolation at ¼ of a sampling frequency is 56% in power, lowering frequency components material to the quality of high-definition images. In order to compensate for the reduced resolution resulting from the linear interpolation, the combined use of a high-frequency emphasizing filter and the linear interpolation might be adopted. The use of such a filter would greatly increase the magnitude of noise components on an image, decreasing the signal-to-noise ratio. With high-definition images, not only the dot sequential error but also a decrease in resolution and signal-to-noise ratio become serious problems.

On the other hand, a three-line color image sensor comprises three linear sensor arrays arranged apart from one another in the direction of sub-scan, i.e., in the direction perpendicular to the direction (main scanning direction) in which one line of an original document is scanned, and three color filters of R, G, and B are disposed on the respective line sensors. Each of the line sensors reads one line of a corresponding color component. The three-line image sensor suffers from a drawback in that it is somewhat complex in structure, that is, a buffer memory is required for compensating for differences in sub-scanning position among line sensors but has the following features. First, the three-line image sensor will not suffer from the above-described dot sequential error because information in the same position can be read for each of three color components. Second, the incident area, i.e., the aperture, in the direction of sub-scan can be chosen freely for each of color components. Thus, the aperture of the line sensor elements for blue (B) filter low in light transmittance can be broadened, thereby maintaining a balance among amounts of received red, green and blue (R, G and B) light rays. This can prevent the degradation of the signal-to-noise ratio of the B signal. Conversely, this will reduce the resolution of the B signal component.

As described above, the prior art techniques have the drawback of producing the degradation of phase and resolution characteristics in compensating color image signals having different phase and resolution characteristics due to the structure of a color image sensor used. In addition, the use of linear interpolation between signals of the same color and high-frequency emphasizing filters in compensating color image signals reduces the signal-to-noise ratio and the resolution.

SUMMARY OF THE INVENTION

It is an object of the present invention to provide a color image reading and compensating device which reads a color image from an original document by the use of a color image sensor and permits the phase and resolution characteristics of resultant color image signals to be compensated without impairing their resolution and signal-to-noise ratio.

According to the present invention, there is provided a color image reading and compensating device equipped with a compensation processing section which, in reading an image using an image reading section having a color image sensor having effective image reading positions that vary with color components, performs phase, resolution characteristic compensation processing on each of a plurality of color component signals output from the image reading section by the use of not only color component signals corresponding in color to one another from a pixel of interest and its nearby pixels but also other color signal components.

Moreover, according to the present invention, there is provided a color image reading and compensating device which is further provided with an image feature detecting circuit for detecting the feature of regions near a pixel of interest from color image signals and a changeover circuit for changing over compensation coefficients used in the compensation processing circuit in accordance with the results of detection by the image feature detecting circuit.

Furthermore, there is provided a color image reading and compensating device equipped with a compensation processing section which, when using a color image sensor in which aperture sizes vary with colors, performs resolution characteristic compensation processing on each of color signal components from the image reading section using not only color component signals corresponding in color to one another from a pixel of interest and its nearby pixels but also other color signal components.

Color signal components of a color image signal have correlation, and spatial differences of an image signal in particular have a strong correlation among color signal components. Thus, since spatial difference information of a color signal component is contained in another color signal component, the use of other color signal components for compensating each color signal as in the present invention permits restoration of information lost in the original color signal. Thereby, phase differences of and resolution imbalance among color signals caused by a color image sensor which have effective image reading positions or aperture sizes that vary with colors can be compensated for.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A and 5B illustrate color image signals and color difference signals compensated by linear interpolation;

FIG. 6 is a diagram for use in explanation of the principle of the compensating process in the first embodiment;

FIGS. 7A and 7B illustrate compensated signals and color difference signals in the first embodiment;

FIGS. 12A and 12B are plan views of portions of color image sensors which may be used in the image reader section;

FIG. 13 is a plan view of a portion of another color image sensor which may be used in the image reader section;

FIGS. 14A and 14B illustrate frequency responses of achromatic colors when compensation coefficients in Table 3 are used in the first embodiment;

DETAILED DESCRIPTION OF THE PREFERRED EMBODIMENTS

Figure 1:
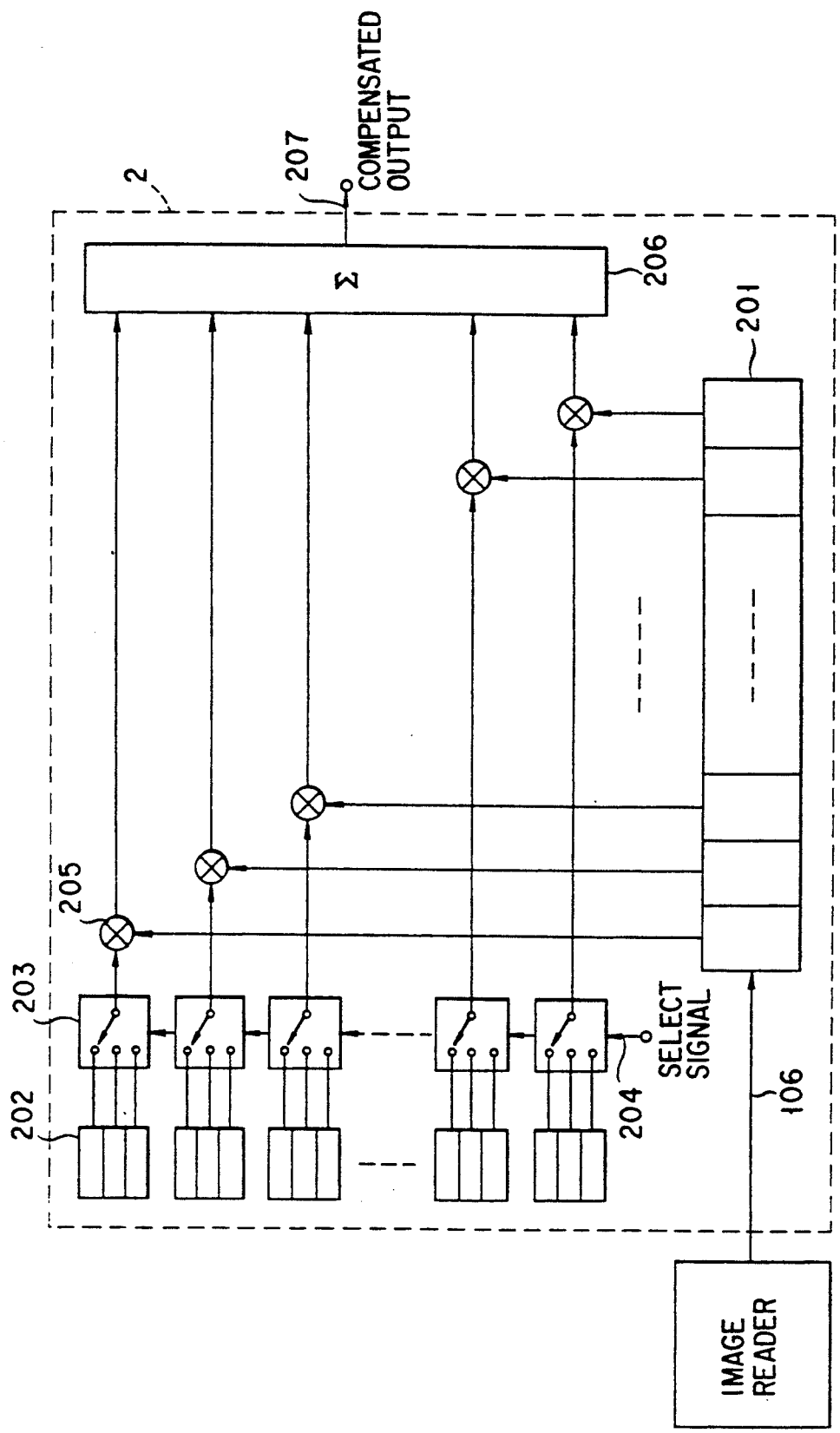
FIG. 1 is a block diagram of a color image reading and compensating device according to a first embodiment of the present invention.

Referring now to FIG. 1, a color image reading and compensating device comprises an image reading section 1 which reads a color image as an electric signal to obtain a color image signal, and a compensation processing section 2 which compensates the color image signal.

Figure 2:
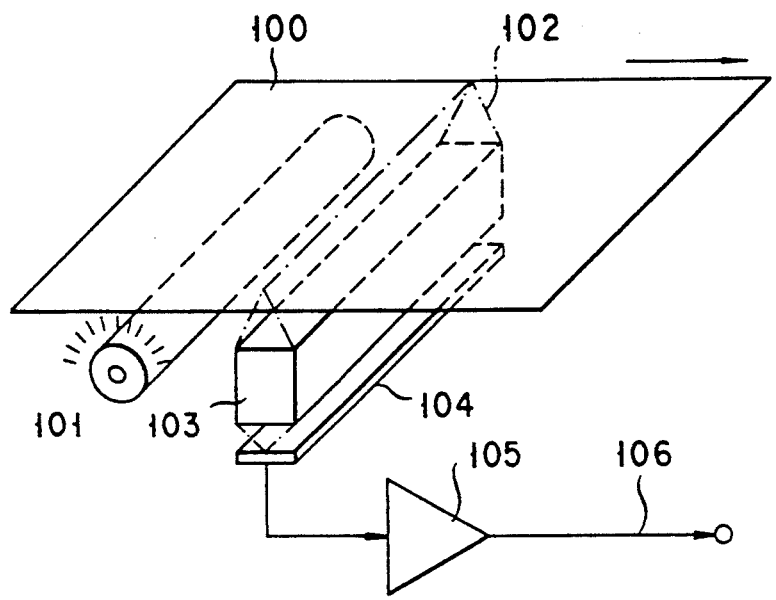
FIG. 2 illustrates an arrangement of the image reader section of FIG. 1.

In FIG. 2 there is shown an arrangement of the image reading section 1. A linear area 102 on a document 100 is illuminated by a light source 101 such as a fluorescent lamp. The illuminated portion is imaged onto the light receiving surface of a color image sensor 104 by an imaging optical system 103 such as a refractive-index distributed cylindrical lens array. Thereby, a color image signal of one line is obtained. Further, by repeating the reading operation while moving the imaging optical system 103 and the color image sensor 104 in the direction perpendicular to a longitudinal line of the sensor, information on the entire surface of the document 100 can be obtained, and a color image signal 106 (hereinafter, the signal is also referred to as the read signal) is outputted via an amplifier (current-to-voltage converter) 105. Herein, the direction of the longitudinal line (length) of the color image sensor 104 is referred to as the main scanning direction, while the direction of the movement is referred to as the sub-scanning direction.

Figure 3:
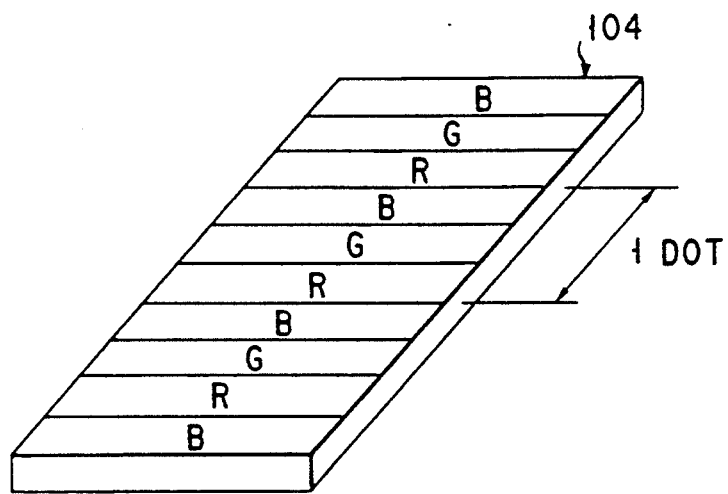
FIG. 3 illustrates a dot sequential color image sensor.

In this embodiment, a dot sequential sensor is used as the color image sensor 104. The dot sequential color image sensor, as shown in FIG. 3, has red (R), green (G) and blue (B) filters which are sequentially disposed on a linear sensor array having sensor elements (photosensitive elements) three times as many in number as the number of pixels. A set of three contiguous R, G and B elements is used as one color pixel. Thus, color image signals (hereinafter, referred to as R, G and B component signals) from the same pixel do not strictly represent image information at the same position; they represent information from positions spaced one-third the size of one pixel apart. An error resulting from this positional difference between sensor elements is referred to as a dot sequential error.

Figure 4A:
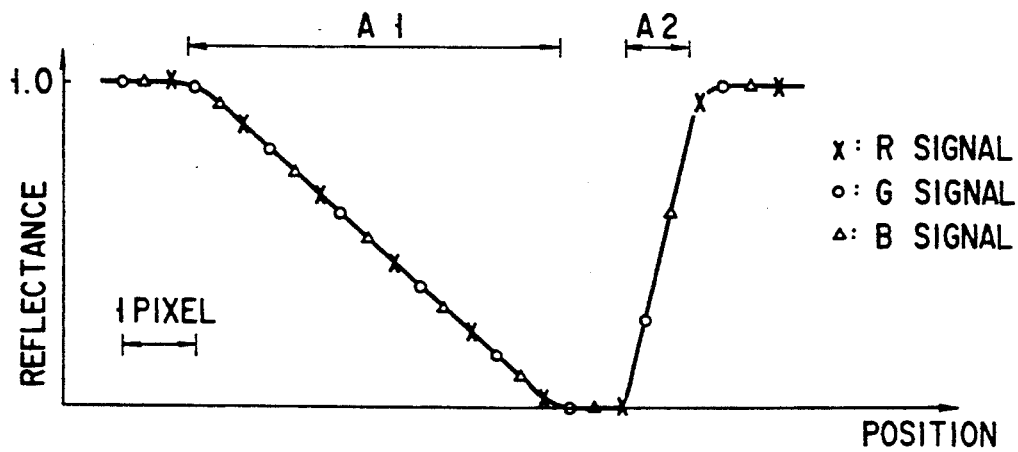
FIGS. 4A to 4C are diagrams for use in explanation of the compensation process in the first embodiment and illustrate the density distribution of an input image, image signals obtained by reading the input image with a dot sequential color image sensor, and color difference signals when no compensation process is performed.
Figure 4B:
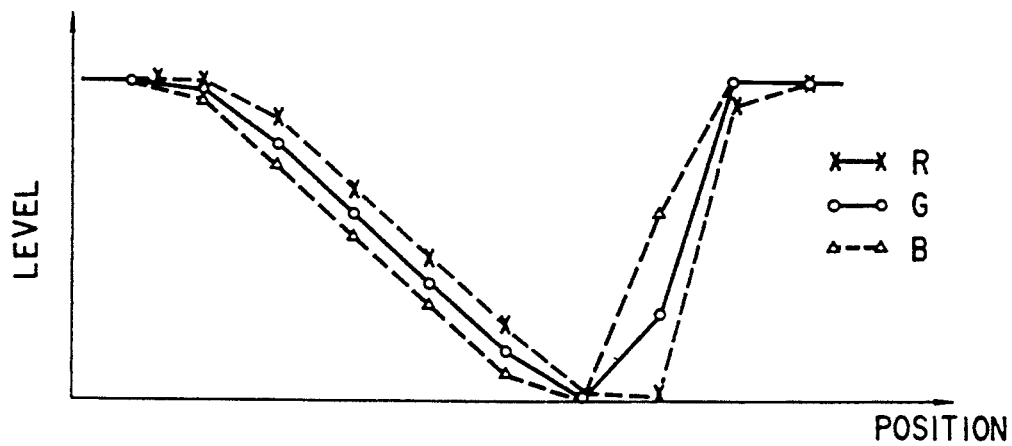
Figure 4C:
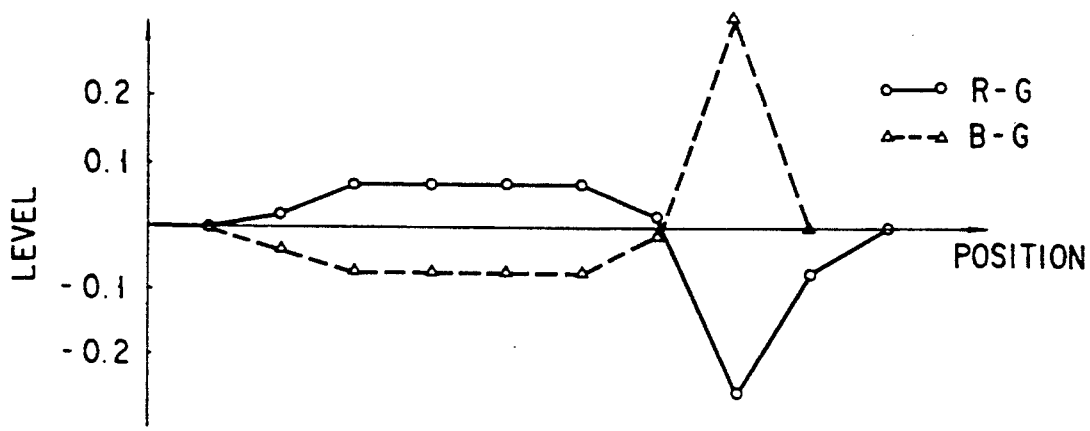

Reference will be made to FIGS. 4A, 4B, and 4C to describe an example of the dot sequential error more specifically.

It is assumed that an achromatic color image having such a reflectance distribution as shown in FIG. 4A is imaged onto the linear sensor. Since the image is achromatic, the reflectance distribution represents the reflectance distribution of each of R, G and B components as it is. Note that, for ease of description, the distribution contains integrals of the sensor apertures as well. That is, in this figure, the intensity at the center of the aperture of an element is a read signal at the element. Assuming the positions of R, G, and B elements in the i-th dot to be represented by PRi, PGi, and PBi, respectively, the R, G, and B signals from the i-th dot will become as shown in FIG. 4B. Regardless of an achromatic image, the R, G, and B signals are not equal to one another in the gradient portion A1 and the edge portion A2 of the image. Thus, the color difference signals (R−G) and (B−G) representing hue will not become zero as shown in FIG. 4C. Although an achromatic edge is taken herein as an example, if an image has a brightness gradient in the main scanning direction, hue shifts corresponding to the brightness gradient will occur because of the dot sequential error.

As a method of eliminating such a dot sequential error, there is a method using linear interpolation. According to this method, a certain color (herein, G) is used as a reference color, and R, G, and B component signals in the position of a reference color element are obtained on the basis of linear interpolation. That is, for the reference color, the read signal is used as it is as reference color information. For the other colors, corresponding color information is estimated by linear interpolation of two signals from two corresponding elements between which the reference color element is interposed. Arithmetic expressions for the linear interpolation are represented by $$Ri' = \tfrac{1}{2}R(i) + \tfrac{1}{2}R(i+1) \quad (1)$$
$$Gi' = Gi$$
$$Bi' = \tfrac{1}{2}B(i) + \tfrac{1}{2}B(i-1)$$

where Ri, Gi, and Bi represent read signals, and Ri', Gi', and Bi' represent corrected signals.

The results of correction of the read signals of FIG. 4B and the color difference signals are shown in FIGS. 5A and 5B, respectively. The color difference signals in the gradient portion A1 are made substantially zero by the linear interpolation, indicating that the dot sequential error is reduced. However, in the edge portion A2, the B signal is not so steep as the other signals, indicating that its resolution is reduced.

The compensation processing section 2 of FIG. 1 compensates for the dot sequential error without reducing resolution. This processing is the point of the present invention. Hereinafter this processing will be described in detail.

The compensation processing section 2 performs compensation processing on read signals output from the image reader section in accordance with expression (2).

$$Ri''=\Sigma\{Prr(j)\cdot R(i+j)+Prg(j)\cdot G(i+j)+Prb(j)\cdot B(i+j)\}$$

$$Gi''=\Sigma\{Pgr(j)\cdot R(i+j)+Pgg(j)\cdot G(i+j)+Pgb(j)\cdot B(i+j)\}$$

$$Bi''=\Sigma\{Pbr(j)\cdot R(i+j)+Pbg(j)\cdot G(i+j)+Pbb(j)\cdot B(i+j)\}$$

where Ri", Gi", and Bi" represents compensated signals.

In compensating the phase characteristics and resolution characteristics of a certain color signal component, the compensation processing, unlike the conventional technique, employs the other color component signals as well. That is, for each of color component signals, the phase and resolution characteristic compensation processing is performed using a corresponding color and the other colors of a pixel of interest to be compensated and pixels near the pixel of interest. Here, Pj indicates a compensation coefficient. Table 1 shows compensation coefficients in the present embodiment.

TABLE 1

| j | −1 | 0 | 1 |
|---|---|---|---|
| Prr(j) | 0.038 | 0.635 | 0.327 |
| Prg(j) | −0.090 | 0.189 | −0.099 |
| Prb(j) | −0.042 | 0.065 | −0.023 |
| Pgr(j) | 0.000 | 0.000 | 0.000 |
| Pgg(j) | 0.000 | 1.000 | 0.000 |
| Pgb(j) | 0.000 | 0.000 | 0.000 |
| Pbr(j) | −0.023 | 0.065 | −0.042 |
| Pbg(j) | −0.099 | 0.189 | −0.090 |
| Pbb(j) | 0.327 | 0.635 | 0.038 |

Particular attention is given to the arithmetic expression for correcting the R signal component, for example, in arithmetic expression (2). Then, it will be understood that a difference between the G and B signal components is added to the linear interpolation of contiguous R signals. Such correction processing provides an improvement in the correction accuracy, which will be described qualitatively with reference to FIG. 6.

FIG. 6 is a schematic illustration of reading of a monochrome image having a downward convex reflectance distribution with a dot sequential color image sensor. In this figure, solid lines represent reflectance distributions of R and G components in the image. For simplicity of description, the reflectance distribution of the B component is omitted. White dots on the solid lines represent sensor read positions and intensities of read signals. In the dot sequential color image sensor, R and G signal components from the i-th dot correspond to information in the positions Pri and Pgi, respectively.

Here, the dot sequential error correction is assumed to be made to estimate the R component in the position Pgi. In the linear interpolation method, the R component is assumed to vary linearly between two points Pri and Pri+1 interposing the position Pgi therebetween, and a value (indicated by x) obtained by interpolating values at the two points in the ratio of distance between Pri and Pgi to the distance between Pgi and Pri+1 is made an estimated value of the R signal in the position Pgi. This method can correctly estimate color signals in a region in which the reflectance varies linearly. In the region in which the reflectance varies in a downward convex manner as shown in FIG. 6, however, the color signal will be estimated at a value larger than an actual value.

Here, when attention is paid to a G signal component in a position between Pri and Pr+1, the G signal value at Pgi is smaller than the average of G signal values at PGi−1 and PGi+1. For this reason, there is high probability that the R signal will also vary in a downward convex manner between Pri and PRi+1 because of color correlation between image signals. As in the present embodiment, therefore, the addition of a quantity (indicated by ↓) corresponding to the degree of the downward convex of the G signal component to the signal obtained by interpolating R signals at both ends of the interval permits the estimated signal to approach the original signal. The B signal can also be estimated in the same manner.

FIGS. 7A and 7B show the results of correction of the read signals of FIG. 4B in accordance with the present embodiment and the resultant color difference signals, respectively. As can be seen, the interpolated color signal component (here, the B signal component) in the edge portion is steeper than in the method based on the conventional linear interpolation, indicating that the signal approaches the original signal.

Simulation using model images was conducted to make comparisons of square error, resolution, and signal-to-noise ratio between the present embodiment and the conventional linear interpolation method. The results of the comparisons are shown in Table 2.

TABLE 2

| Evaluation Error | Color | Embodiment | Linear Interpolation |
|---|---|---|---|
| Corrected Error | White/Black | 0.55 | 0.79 |
| | White/Red | 0.66 | 0.71 |
| | White/Cyan | 0.39 | 0.35 |
| | Red/Cyan | 1.31 | 1.06 |
| Resolution | White/Black | 0.85 | 0.56 |
| | White/Red | 0.66 | 0.56 |
| | White/Cyan | 0.48 | 0.56 |
| | Red/Cyan | 0.41 | 0.56 |
| S/N | — | 0.57 | 0.56 |

The square error was evaluated by the square sum of differences between monochromatic edge image signals and signals read by a color image sensor with no dot sequential error. Sets of colors on both sides of the edge are (black/white), (red/white), (cyan/white), and (red/cyan). The resolution was evaluated by a response obtained when a monochromatic sinusoidal image of a frequency one-fourth the sampling frequency was read. In this case as well, four sets of colors were used at positive and negative peaks of the sinusoidal wave; (black/white), (red/white), (yellow/white), and (red/cyan). The signal-to-noise ratio was evaluated by the variance of noise contained in a signal after correction processing for a read signal to which white noise having a variance of unity had been added. In the case of black and white, the square error and the resolution are significantly improved as compared with those in the conventional method. Such is also the case with the set of red and white. On the other hand, in the case of cyan and white, the square error and the resolution are substantially the same as those in the conventional method. In the case of complementary colors of red and cyan, the square error and the resolution are rather worse than those in the conventional method. The signal-to-noise ratio is substantially the same as before.

The results reveal that the correcting method of the present embodiment offers significant improvements in the resolution and error of white and black, white and red edge images over the conventional method and moreover scarcely introduces an increase in noise. Many portions of a high-definition image are comprised of such color sets, and the quality of these portions is most significantly impaired by dot sequential noise. Accordingly, the correcting method of the present invention is effective in correcting high-definition image signals.

Although the results of evaluation of only edge images in which a set of colors on both sides of the edge are pure colors, such as black and white, white and red, are shown herein, the processing of the present embodiment will produce the same effect on intermediatecolor edge images. The processing of the present embodiment is also effective in the case where there is positive correlation among R, G, and B components of two colors on both sides of the edge, such as white and gray, gray and pale red, green and gray, in other words, where the two colors are identical or close to each other in hue but differ from each other in lightness. For example, when an edge image in which colors on both sides of the edge portion are white and gray is read by a color image sensor, its output signal will involve a hue shift in the edge portion. The hue shift can be corrected for by the processing of the present embodiment. The steepness of the edge in the signal will also become greater than in the conventional technique.

Next, a method of determining correction coefficients will be described.

In the present embodiment, the spatial difference between signals of the same color of a color image is considered to have a pixel-independent three-dimensional normal distribution model, and correction coefficients are determined such that a signal having the highest probability will become an estimated value. In general, the R, G, and B components of a color image are not independent of one another but have positive correlation. Further, the spatial differentiations (or differences) of the R, G, and B components of a color image also have strong positive correlation.

The covariance matrix C of R, G, and B spatial differences $\delta R$, $\delta G$, and $\delta B$ (difference in signal level between adjacent pixels) was calculated in accordance with equation (3) with respect to a color character image and a color dot image. The results Cs and Cc for the color character image and the color dot image are shown in equation (3). The results reveal that each image has strong positive correlation among the R, G, and B spatial difference signals. This indicates that there is a high probability of increase in the G and B components in a portion in which the R component increases locally.

$$C = \begin{pmatrix} \Sigma \delta R \cdot \delta R & \Sigma \delta R \cdot \delta G & \Sigma \delta R \cdot \delta B \\ \Sigma \delta G \cdot \delta R & \Sigma \delta G \cdot \delta G & \Sigma \delta G \cdot \delta B \\ \Sigma \delta B \cdot \delta R & \Sigma \delta B \cdot \delta G & \Sigma \delta B \cdot \delta B \end{pmatrix} \quad (3)$$

$$Cs = \begin{pmatrix} 0.0094 & 0.0053 & 0.0037 \\ 0.0053 & 0.0126 & 0.0060 \\ 0.0037 & 0.0060 & 0.0072 \end{pmatrix}$$

$$Cc = \begin{pmatrix} 0.0061 & 0.0056 & 0.0052 \\ 0.0056 & 0.0071 & 0.0061 \\ 0.0052 & 0.0061 & 0.0073 \end{pmatrix} \quad (4)$$

At this point, consider that a difference image is approximated by normal distribution. Suppose that the logarithm of the probability density in which the R, G, and B components of the difference image at a certain pixel are $\delta R$, $\delta G$, and $\delta B$ is the likelihood L. Then, the likelihood L is represented by $$L = \begin{pmatrix} \delta R \\ \delta G \\ \delta B \end{pmatrix}^t A \begin{pmatrix} \delta R \\ \delta G \\ \delta B \end{pmatrix} \quad (5)$$

The likelihood matrix A is the inverse matrix of the covariance matrix C of the difference image. Assume that the length of one dot is 1, and the coordinate of the position Gi of the G sensor in the i-th dot is i. Then, the coordinates of the positions PRi and PBi will be $i-\frac{1}{3}$ and $i+\frac{1}{3}$, respectively. Let the R, G, and B signals at the coordinate x be R(x), G(x), and B(x), respectively. Here, signals in the positions $i-\frac{1}{3}$, i, and $i+\frac{1}{3}$ are estimated from a set of signals obtained actually as sensor signals by means of the method of maximum likelihood. Assuming that the inverse matrix of the covariance matrix of difference image between adjacent pixels spaced by one-third the dot length is A, the sum E of likelihoods for all pixels becomes as indicated in equation (6).

$$E = \sum_i \begin{pmatrix} Pr(i+1) - Pr(i) \\ Pg(i+1) - Pg(i) \\ Pb(i+1) - Pb(i) \end{pmatrix}^t A' \begin{pmatrix} Pr(i+1) - Pr(i) \\ Pg(i+1) - Pg(i) \\ Pb(i+1) - Pb(i) \end{pmatrix} \quad (6)$$

Assuming $R(i-\frac{1}{3})$, $G(i)$, and $B(i+\frac{1}{3})$ are each a constant, a set of signals that maximizes the likelihood E will be its solution. Assuming that the result of partial differentiation of E with respect to a signal other than $R(i-\Delta)$, $G(i)$ and $B(i+\frac{1}{3})$ becomes 0, linear simultaneous equations containing these signals as variables will result. Solving these equations, R(i) and B(i) are found to be in the form of a linear combination of constants $R(i-\frac{1}{3})$, G(i) and $B(i+\frac{1}{3})$. If terms except the nine central terms having relatively great coefficients are ignored, then equation (2) will hold. If the matrix A' is assumed to be simply represented as expression (7), then the correction coefficients of Table 1 will be obtained.

$$A' = \begin{pmatrix} 1.0 & -0.3 & -0.3 \\ -0.3 & 1.0 & -0.3 \\ -0.3 & -0.3 & 1.0 \end{pmatrix} \quad (7)$$

According to the present invention, as described above, by performing correction calculations in accordance with expression (2), a signal having the maximum likelihood can be obtained on the assumption that differences between adjacent pixels have a normal distribution. Although, in the above description, a simple expression was used as the matrix A', the use of a matrix A' derived from a covariance matrix for an average image would permit estimation with greater accuracy.

In the present embodiment, the position of the G filter was referred to for estimation. Alternatively, the position of the R filter or the B filter may be referred to. In addition, a position except the center of a sensor, for example, a position intermediate between the R and G filter sensors may be used as the reference position. Further, the correction coefficients were determined so as to maximize the likelihood among R, G, and B components of an adjacent-pixel difference signal. This is not restrictive. For example, since there is correlation between pixels spaced by two or more pixels, such correlation may be reflected in the likelihood. In this case, although the correction coefficients are not necessarily identical to those in Table 1, the correction expression will be the same as expression (2).

Although, in the present embodiment, the correction coefficients were determined so as to maximize the likelihood, they may be determined to produce a significant improvement in correction error or resolution. An example of a way of determining correction coefficients so as to improve the correction error or resolution will be described next. In this example, on the condition that an error in reading of a constant density image is 0 (expression (8)) and on the condition that an error in reading of a gradation image is 0 (expression (9)), correction coefficients are determined so that the frequency response for an achromatic input (expression (10)) may become optimum. Here, a good frequency response means that absolute values of the frequency response assume values close to unity up to high frequencies, and moreover there is little difference among R, G, and B. Expression (11) indicates variations in amplitude and phase of an output signal obtained by reading an achromatic image having a sinusoidal density distribution with a sensor assumed to have point-like apertures and performing the above-described correction calculations on the read signals from the sensor. Thus, the expression contains no effect of integrals at the sensor apertures, and the response of a G signal subjected to no correction is unity regardless of frequency.

$$\Sigma Pcd(j) = 1 \text{ (if } c = d) \quad (c, d \in \{r, g, b\}) \quad (8)$$
$$\quad 0 \text{ (if } c \ne d)$$

$$\Sigma Prc(j) \cdot j = a + \frac{1}{3} \quad (9)$$
$$\Sigma Pgc(j) \cdot j = a$$
$$\Sigma Pbc(j) \cdot j = a - \frac{1}{3}$$

(a stands for the x coordinate of the reference position seen from the position of a G element)

$$Fc(f) = \sum_i Pcr(i) \cdot \exp(-2\pi j f \cdot (i - \tfrac{1}{3})) \quad (10)$$
$$Pcg(i) \cdot \exp(-2\pi j f \cdot (i))$$
$$Pcb(i) \cdot \exp(-2\pi j f \cdot (i + \tfrac{1}{3})) \quad (c = \epsilon\{r, g, b\})$$

$$V = \sum_i Pcr(i)^2 + Pcg(i)^2 + Pcb(i)^2 \quad (11)$$

An example of correction coefficients thus determined is shown in Table 3. Also, the frequency characteristics when these correction coefficients are used are shown in FIG. 14. As can be seen from the characteristics, as compared with the characteristics (indicated by broken lines) by the conventional linear interpolation method, the responses of R and B signals in the real part are high up to high frequencies, and the differences among R, G, and B signals in the imaginary part are small.

TABLE 3

| j | −1 | 0 | 1 |
|---|---|---|---|
| Prr(j) | 0.000 | 0.667 | 0.333 |
| Prg(j) | −0.110 | 0.220 | −0.110 |
| Prb(j) | −0.070 | 0.140 | −0.070 |
| Pgr(j) | 0.000 | 0.000 | 0.000 |
| Pgg(j) | 0.000 | 1.000 | 0.000 |
| Pgb(j) | 0.000 | 0.000 | 0.000 |
| Pbr(j) | −0.070 | 0.140 | −0.070 |
| Pbg(j) | −0.110 | 0.220 | −0.110 |
| Pbb(j) | 0.333 | 0.667 | 0.000 |

In FIG. 14, the responses of the R and B signals are improved to approach the G signal, but there is still a difference between each of the R and B signals, and the G signal. When a balance among R, G, and B signals is important, the frequency of the G signal can be dropped positively to bring the frequency responses of the R, B, and G signals close to one another. To be specific, the correction coefficients shown in Table 4 can be used.

TABLE 4

| j | −1 | 0 | 1 |
|---|---|---|---|
| Prr(j) | 0.000 | 0.667 | 0.333 |
| Prg(j) | −0.110 | 0.220 | −0.110 |
| Prb(j) | −0.070 | 0.140 | −0.070 |
| Pgr(j) | −0.140 | 0.280 | −0.140 |
| Pgg(j) | 0.200 | 0.600 | 0.200 |
| Pgb(j) | −0.140 | 0.280 | −0.140 |
| Pbr(j) | −0.070 | 0.140 | −0.070 |
| Pbg(j) | −0.110 | 0.220 | −0.110 |
| Pbb(j) | 0.333 | 0.667 | 0.000 |

Figure 15A:
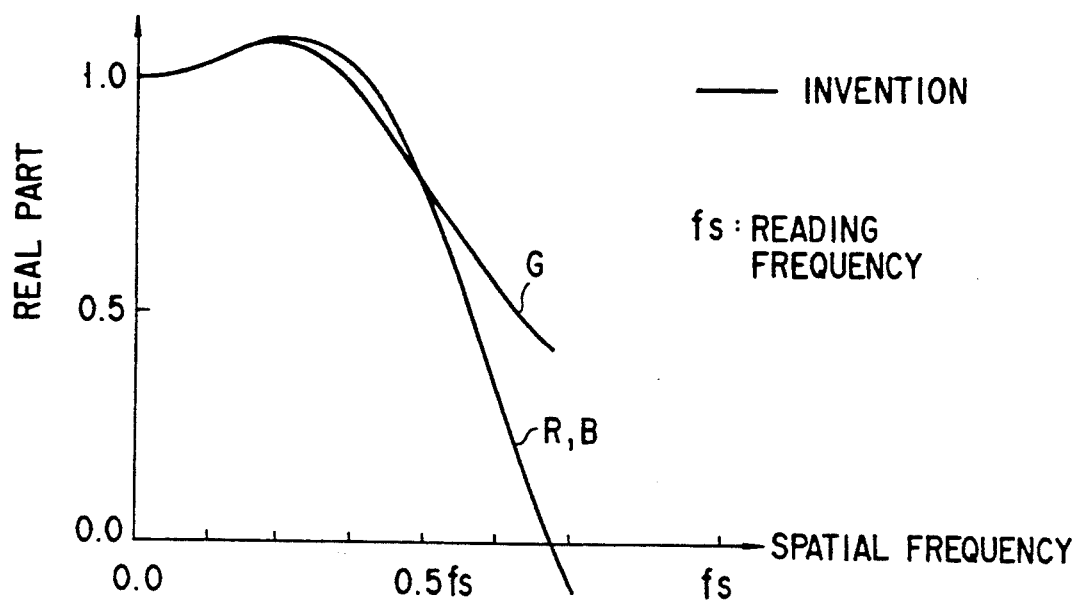
FIGS. 15A and 15B illustrate frequency responses of achromatic colors when compensation coefficients in Table 4 are used in the first embodiment.
Figure 15B:
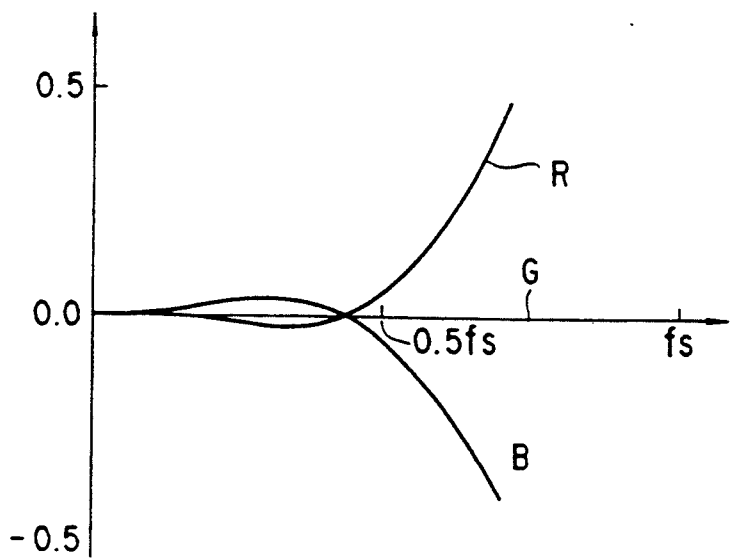

Frequency characteristics when the correction coefficients shown in Table 4 are used are illustrated in FIG. 15. The use of the correction coefficients thus determined improves the resolution characteristics of and the balance among R, G, and B signals, which enhances the effect of reducing the bleeding of fine black lines in particular.

Next, the correction processing section 2 of FIG. 1, which performs the above-described correction processing according to the present embodiment, will be described in detail.

The correction processing section 2 performs the correction processing on a color image signal 106 containing color components in the sequential order of Ri, Gi, and Bi from the image reading section 1. First, the color image signal 106 is stored in a shift register 201 with eleven stages. On the other hand, eleven coefficient signals are selected out of 33 coefficient registers 202 by eleven selectors 203 which responds to a select signal 204. The select signal is a signal that indicates to which a pixel of interest among R, G, and B, i.e. a signal in the center of the shift register 201 corresponds. The stage outputs of the shift register 202 are respectively multiplied by the selected coefficients in multipliers 205, and then the results are added together in an adder 206, providing a corrected output signal 207. The correction coefficient registers 202 store the correction coefficients P used in expression (2), so that calculations are performed by expression (2).

The correction processing section is similar in circuit arrangement to an ordinary digital filter and thus can readily be implemented by the use of a general-purpose integrated circuit for digital filter. If the conditions of expressions (8) and (9) are used for determining the correction coefficients, these conditions may also be used to reduce the number of times of multiplication.

Next, a second embodiment of the present invention will be described with reference to FIG. 8.

The second embodiment is arranged to detect local characteristics of an image and change correction coefficients accordingly, thereby improving the correction accuracy further. To this end, a means of detecting characteristics of an image and a means of changing correction coefficients are added to the first embodiment. The other portions, such as the image reading section, etc., are the same as those in the first embodiment. The image reading section is identical to that in the first embodiment, and thus its description is omitted.

With the second embodiment, an image signal obtained by the image reader section 1 is input to an image feature detecting section 4, which detects colors of regions on both sides of a pixel of interest as image features of regions neighboring the pixel of interest.

Figure 9:
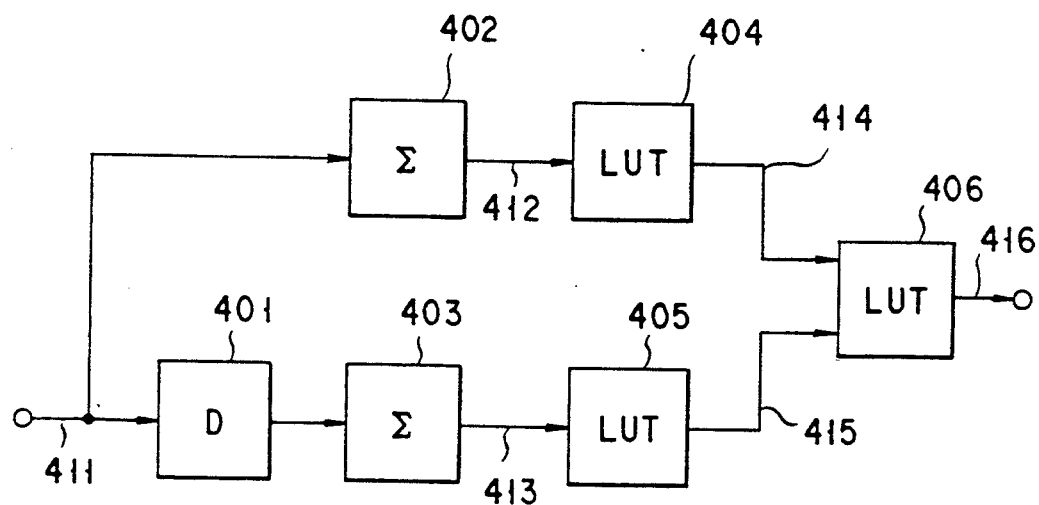
FIG. 9 is a block diagram of the image feature detecting section of FIG. 8.

In the image feature detecting section 4 shown in FIG. 9, adders 402 and 403 calculate the averages of color signals for regions comprised of a few pixels (three pixels in this embodiment) on both sides of a pixel of interest contained in a color image signal 411 from the image reader 1, outputting average color signals 412 and 413. The average color signals 412 and 413 are respectively applied to lookup tables 404 and 405 each comprising a ROM, which identify colors of the respective regions to produce color code signals 414 and 415. The color code signals 414 and 415 access still another lookup table 406, which produces an image feature signal 416 corresponding to a set of two colors.

Figure 8:
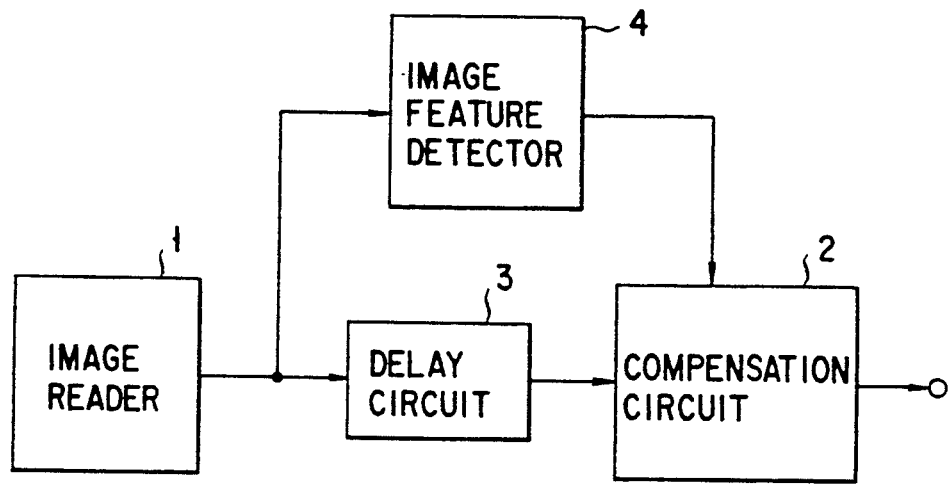
FIG. 8 is a block diagram of a color image reading and compensating device according to a second embodiment of the present invention.

In FIG. 8, on the other hand, the color image signals from the image reader section 1 are input to the correction processing section 2 via a delay circuit 3. The delay circuit 3 is provided to delay the timing of application of the color image signals to the correction processing section 2 to fit the signal delay introduced in the image feature detecting section 4. The time delay of the delay circuit 3 is made equal to that introduced in the detecting section 4. The correction processing section 2 makes corrections in accordance with expression (2) as in the first embodiment.

The second embodiment is distinct from the first embodiment in that two or more sets of correction coefficients are prepared previously, and a set of correction coefficients used is selected in accordance with an image characteristic signal 416 from the image feature detecting section 4. The relationship between an image characteristic signal 416 and a set of correction coefficients selected is as follows. For example, when, like black and white, a set of colors on both sides of a pixel of interest has a large difference in lightness, the correction coefficients in Table 1 are used as in the first embodiment. When colors, like red and cyan, are close to each other in lightness but differ in hue, correction coefficients are used that are equivalent to the conventional linear interpolation. Changing correction coefficients in accordance with local characteristics of an image permits more accurate corrections matched with image characteristics. As was stated in connection with the first embodiment, the covariances of difference images slightly vary in accordance with types of images, and optimum correction coefficients are supposed to vary with types or parts of images. In the first embodiment, the correction accuracy is high for a black and white edge but is low for a red and cyan edge. Detecting a set of colors on the periphery of a pixel of interest and changing over correction coefficients accordingly as in the second embodiment permit the avoidance of partial deterioration caused by corrections that the first embodiment suffers.

As described above, the second embodiment detects colors on both sides of a pixel of interest serving as local characteristics of an image and changes over correction coefficients in accordance with detected color information. However, this is not restrictive so long as detected information represents the property of local variations of an image. For example, the local covariance of a difference image of an image or its coded version may be used as an image characteristic signal. In addition, a decision may be made manually or automatically as to whether an image on a document is in full color or in monochrome so that correction coefficients can be changed accordingly. A binary image, a dot image, a continuous gradation image, a monochrome image, and a full color image differ from one another in statistical property of color signals. Thus, by changing over correction coefficients, more accurate corrections can be made to image signals. In addition, correction coefficients may be changed over, depending upon whether an enlargement/reduction process is performed on the image signals.

A third embodiment of the present invention will be described hereinafter.

Figure 10:
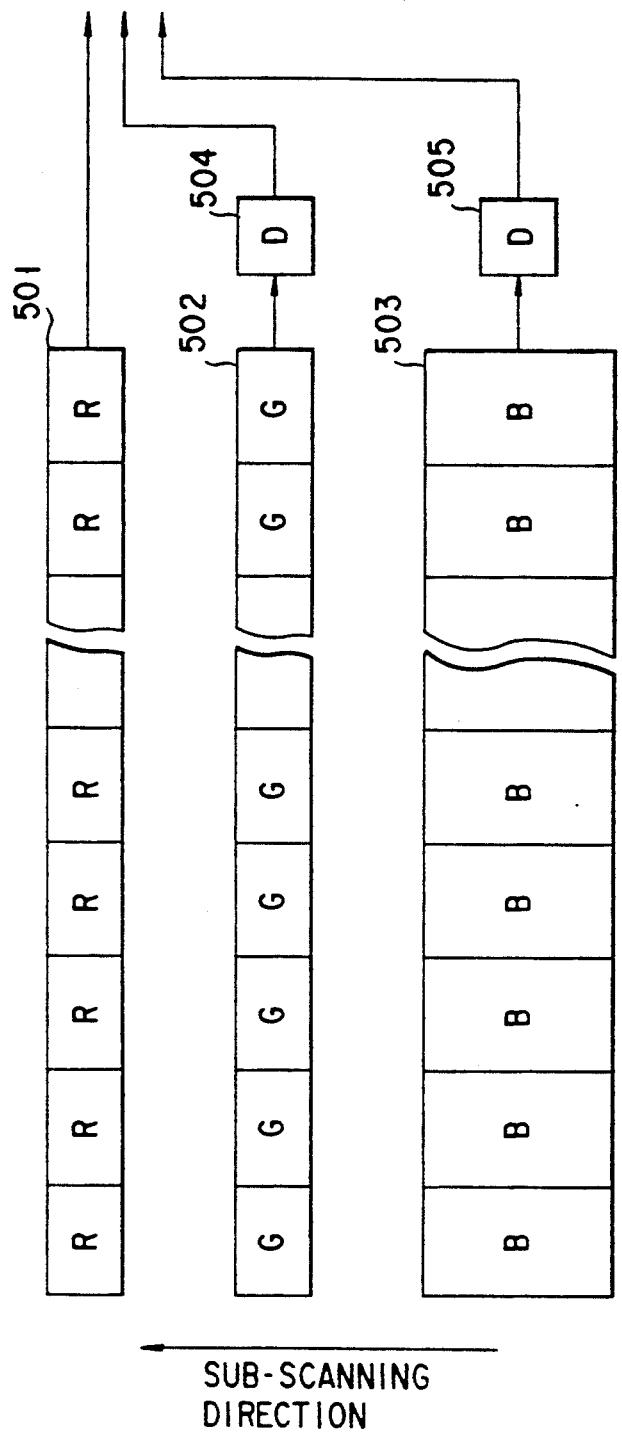
FIG. 10 illustrates an arrangement of a linear sensor used in a third embodiment of the present invention.

The third embodiment is the same in arrangement as the first embodiment except that a three-line image sensor is used in the image reading section 1. The three-line color image sensor, as shown in FIG. 10, comprises three line sensors 501, 502, and 503 and R, G, and B color filters disposed on the light receiving surfaces of the respective line sensors. By recording an image of a document using the three line sensors, image information containing three color components can be obtained. Although the three line sensors are separated in the sub-scanning direction, delaying read signals by amounts corresponding to the sensor spacing and the sub-scanning speed enables three color information signals in the same position to be obtained.

The commonly used B filter has several times less transmittance than the R and G filters. To control a reduction in the signal-to-noise ratio of a B signal, therefore, the size of the aperture of each B sensor element in the sub-scanning direction is made larger than that of R and G sensor elements (three times in this embodiment). Thereby, the quantities of light received by the R, G, and B sensor elements are made substantially equal to one another, permitting the signal-to-noise ratio of the B signal component to be made substantially equal to those of the R and G signal components.

Figure 11A:
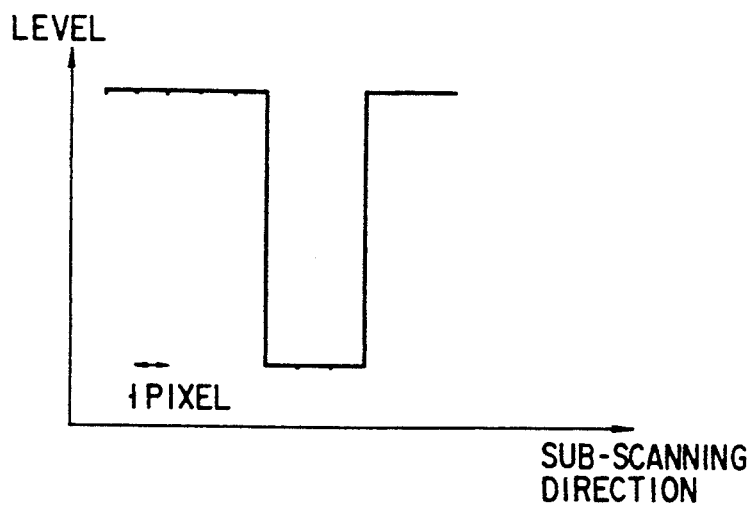
FIGS. 11A to 11C illustrate the reflectance distribution of a black-line document, signals read from the document, and corrected signals.
Figure 11B:
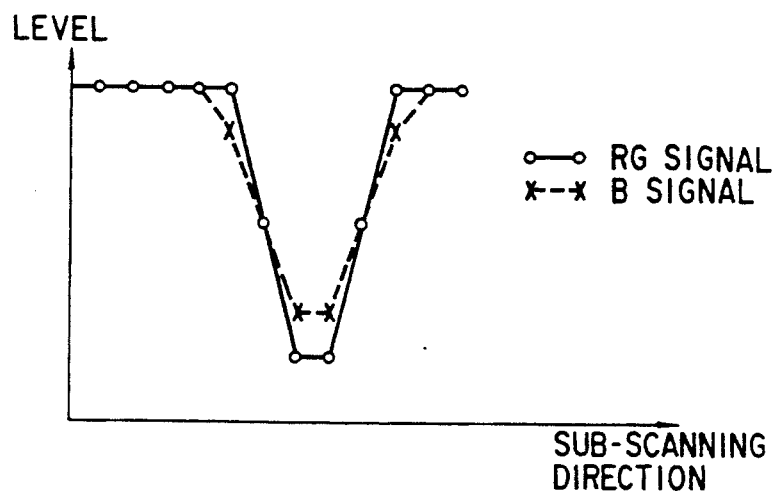

However, making the aperture of the B sensor elements large would reduce the resolution of the B signal. This would cause problems in reading a high-definition image such as a character. For example, when a black and white line image as shown in FIG. 11 A is read, such R, G, and B signals as shown in FIG. 11B will result. The resolution imbalance between each of the R and G signal components, and the B signal component makes the B signal component larger than the R and G signal components on the line but makes the B signal smaller than the R and G signals on both sides of the line. For this reason, the black line itself will be reproduced bluish, while the periphery of the black line will be reproduced yellowish.

In the second embodiment, in order to prevent such phenomena from occurring, the correction processing section compensates for the reduction in resolution of the B signal component using correlation between colors. The correction processing section performs a compensation process on image signals read by the image reading section in accordance with equation (12).

$$Ri' = Ri \qquad (12)$$
$$Gi' = Gi$$
$$Bi' = B(i) + Kr \cdot (R(i-1) - 2R(i) + R(i+1))$$
$$\qquad + Kg \cdot (G(i-1) - 2G(i) + G(i+1))$$

where Ri, Gi, and Bi represent read signals at sub-scanning position i, and Ri', Gi' and Bi' represent the results of the compensation.

The compensation process is performed only on the B signal component with reduced resolution. The process is addition of differences between R and G signal components. The reason why the resolution can be compensated for by this compensation process will be described below.

Figure 11C:
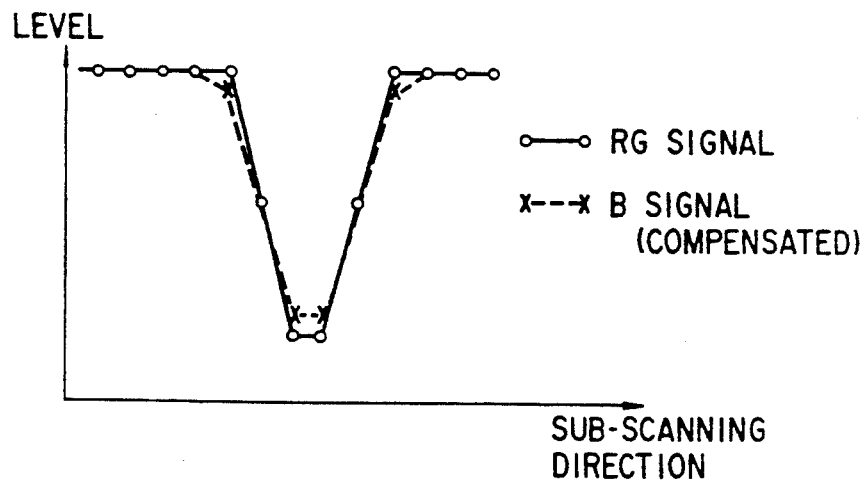

As was described in connection with the first embodiment, there is a strong correlation between spatial differences of color signals, and there is high probability that the B signal component will also increase in portions where the R and G signal components increase. Even in portions where the B signal component varies gradually, therefore, if the R and G signal components vary greatly in those portions, there is a high possibility that the B signal component that should originally have varied greatly will vary gradually because of reduced resolution due to the broad aperture of the B sensor elements. Thus, a signal close to the original B signal component can be estimated by adding differences between R and G signal components. By such compensation, the B signal in FIG. 11B will be compensated for as shown in FIG. 11C. That is, the reduction in resolution is compensated for, and the coloring at line edges is decreased greatly.

Next, the quantitative significance of the method of determining correction coefficients and the arithmetic expressions for corrections will be described. Here, as in the first embodiment, correction coefficients are determined on the assumption that the spatial differences between color signals from adjacent pixels in the sub-scanning direction follow a normal distribution. Suppose that a B signal component that is assumed to be read with the same aperture as that for R and G signal components is represented by Bi'. Then, estimation is made of Bi that makes the sum E of all pixels of likelihood L indicated by expression (13) maximum. In order to maximize the sum E, it is necessary that the partial differentiation of expression (13) at Bi become 0. This is indicated by expression (14).

Since the aperture (area) of the sensor element for the B signal component is three times as large as that of each of the sensor elements for R and G signal components, the B signal Bi which has been read actually and the B signal Bi' assumed to be read with the aperture equal in size to that for R and G components are related by expression (15). By solving simultaneous equations (14) and (15) for Bi', equation (12) for correction can be obtained. By selecting correction coefficients Kr and Kg to be as indicated by expression (16), a signal having maximum likelihood will be estimated. The correction coefficients need not necessarily be determined so as to make the likelihood maximum as described above. As was described in connection with the first embodiment, the coefficients may be determined so as to make the resolution of a black and white edge maximum. Although, in the second embodiment, the aperture size of B sensor elements is set to be three times as large as that for R and G sensor elements, this is not restrictive. Also, the aperture of sensor elements other than B sensor elements may be broadened. In this case, however, optimum correction coefficients will be different from those in the embodiments.

$$E = \sum_i \begin{array}{ccc} R(i+1) - R(i) & t & R(i+1) - R(i) \\ G(i+1) - G(i) & A & G(i+1) - G(i) \\ B(i+1) - B(i) & & B(i+1) - B(i) \end{array} \qquad (13)$$

$$\Sigma A13 \cdot (2R(i) - R(i-1) - R(i+1)) \qquad (14)$$
$$+ A23 \cdot (2G(i) - G(i-1) - G(i+1))$$
$$+ A33 \cdot (2B(i) - B(i-1) - B(i+1)) = 0$$

-continued $$Bi = \tfrac{1}{3}(B'(i-1) + B'(i) + B'(i+1)) \quad (15)$$

$$Kr = A13/(3 \cdot A33) \quad (16)$$
$$Kg = A23/(3 \cdot A33)$$

Next, a fourth embodiment of the present invention will be described.

The fourth embodiment is an application of the present invention to a multi-color image input device. The device reads a multi-color image whose colors used are known previously, e.g., an image drawn or printed in five colors of black, white, red, green, and blue, and outputs color signals separately. For example, the fourth embodiment is adaptable to a reading device such as a color character input device.

Figure 16:
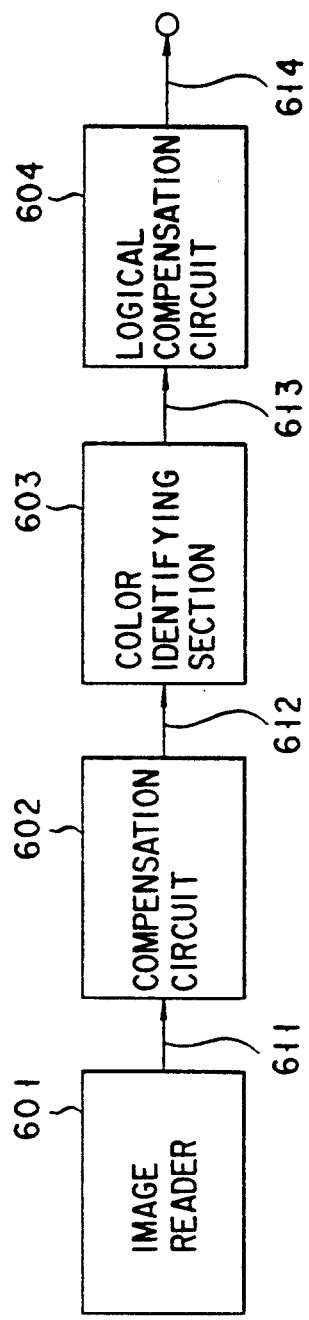
FIG. 16 is a block diagram of a multi-color image input device according to a fourth embodiment of the present invention.

In FIG. 16 there is shown a block diagram of the fourth embodiment. First, in an image reading section 601, an image on document is read by the use of a dot sequential sensor. The image is a multi-color image. By a correction processing section 602, dot sequential errors in an image signal 611 from the image reading section 601 can be corrected. The image reading section 601 and the correction processing section 602 are the same in arrangement as those in the second embodiment, and thus a detailed description thereof will be omitted.

The R, G, and B color image signals 612 output from the correction processing section 602 are applied to a color identifying section 603 for conversion to a color code signal 613. Color codes specified by the color code signal represent five colors, e.g., white, black, red, green, and blue in this embodiment. The color code signal comprises three bits to represent white, black, red, green, and blue by 0, 1, 2, 3, and 4, respectively.

There are some methods of converting an RGB color image signal to a color code signal. In this embodiment, a lookup table method is used. For example, R, G, and B components of the RGB color image signal are quantized to 6 bits, 6 bits, and 5 bits, respectively, and a lookup table storing 3-bit color codes is referred to by an address signal having a total of 17 bits, thereby converting a color image signal to a corresponding color code signal. This table is previously set up using chromaticity distributions of five colors which may be entered as documents.

Next, a logical correction processing section 604 performs logical correction processing on the color code signal 613 output from the color identifying section 603. The logical correction processing section 604 performs corrections to color code signals erroneously identified because of bleeding or noise on the basis of inherent properties of multi-color images. That is, with a multi-color image such as a color document image, each color is used to represent a different type of image information, and thus the same color is used in each of graphical units. Therefore, pixels of each color are linked together, and there is very little possibility that pixels of different colors other than white exist adjacent to one another or independently of one another.

Taking such properties into account, the logical correction processing section 604 makes corrections in accordance with the following predetermined rules. For example, when pixels adjacent to a pixel identified to have a color other than black and white are black, the color code of that pixel is converted to black. Although, in this example, the most simple rules are used for the logical correction processing, more complex rules can be used to improve the correction accuracy. Such logical correction processing permits bleeding or error that cannot be corrected by the correction processing section 602 to be decreased further.

According to the fourth embodiment, as described above, the combined use of the correction processing of the present invention and the logical correction processing permits more accurate corrections to be made.

Although, in the above embodiments, a dot sequential color image sensor or a three-line color image sensor is used in the image reading section, the present invention is not restricted to the use of such a color image sensor. Use may be made of any color image sensor in which phase and resolution characteristics of R, G, and B signal components vary in the main scanning direction or in the sub-scanning direction. Color image signals obtained from such a color image sensor can be corrected in the same manner. For example, the correction process of the present invention is effective in correcting color image signals from such a dot sequential image sensor as shown in FIG. 12 in which there is a difference in aperture size among R, G, and B sensor elements, such a three-line color image sensor as shown in FIG. 13 in which R, G, and B sensor elements are not in alignment with one another in the main scanning direction, or a three-line color image sensor in which the line sensor spacing in the sub-scanning direction cannot be compensated for by the use of signal delay processing.

Moreover, the present invention would also be effective in correcting differences in phase and resolution characteristics among R, G and B signal components resulting from factors other than the structure of the sensor used. For example, the correction process of the present invention would also be effective in the case where there are differences in resolution or phase among R, G, and B signals resulting from the chromatic aberration of an imaging optical system used.

As described above, the present invention can compensate for phase differences (hue shifts) and resolution imbalance among color image signals obtained by reading a document by a color image sensor in which the effective reading positions or the aperture sizes vary among color components. This permits bleeding noise occurring in reading, for example, a black character to be reduced greatly.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A color image reading and compensating device comprising:

image reading means including a color image sensor for forming a number of dots arranged in a line, each of the dots being composed of a plurality of pixels corresponding to a plurality of colors, respectively, for outputting a color image signal having a plurality of color signal components for each dot; and compensating means for compensating phase and resolution characteristics of the color image signal, by use of not only one color signal component selected from the color signal components of the color image signal but also the other color signal components indicating at least one color different from that of the one color signal component, said one color signal component corresponding to a dot of interest and the other signal components corresponding to dots in close proximity to the dot of interest.

2. The color image reading and compensating device according to claim 1, wherein said compensating means includes linear compensating means connected to said image reading means, for receiving the color image signal having R, G, and B color signal components from said image reading means, and for linear-compensating the R color signal component, and adding means for adding at least one of a first difference between the G color signal components each serving as a reference position for each dot and a second difference between the B color signal components to a linear compensation result of the R color signal component which is obtained by said linear compensating means.

3. The color image reading and compensating device according to claim 1, wherein said compensating means comprises a shift register for storing a color image signal read out by said image reading means, register means for storing a plurality of compensation coefficients, selection means for selecting the compensation coefficients in said register means in accordance with the color image signal read out by said image reading means, multiplying means for multiplying the compensation coefficient selected by said selection means by a color signal component corresponding thereto, sum means for summing results obtained by said multiplying means and outputting a sum as a compensated signal.

4. The color image reading and compensating device according to claim 3, wherein said compensating means includes image characteristic detecting means for detecting local characteristics of the color image signal, and said selection means selects the compensation coefficient in accordance with a detection result obtained by said detecting means.

5. The color image reading and compensating device according to claim 4, wherein said detecting means detects the local characteristics of pixels from color signal components of pixels for forming dots positioned on both sides of a dot of interest.

6. The color image reading and compensating device according to claim 4, wherein said detecting means includes average means for calculating an average value of identical color signal components obtained from the pixels corresponding to the dots positioned on both sides of the dot of interest, to obtain a plurality of average value signals corresponding to a plurality of colors, first look-up table means in which a plurality of color code signals are stored, the color code signals being read out selectively by the average value signals as addresses, and second look-up table means in which a plurality of image characteristic signals are stored, the image characteristic signals being read out selectively by the color code signals as addresses.

7. The color image reading and compensating device according to claim 4, wherein said detecting means detects image characteristic of binary image, dot image, continuous gradient image, monochromatic image, and full color image, to output image characteristic signals corresponding thereto.

8. The color image reading and compensating device according to claim 1, wherein said pixels of each of the dots have three pixels corresponding to three fundamental colors R, G, and B, at least one of which has an aperture having a size different from that of the other.

9. The color image reading and compensating device according to claim 8, wherein the pixels corresponding to the color R have an aperture size larger than that of the pixels corresponding to the remaining colors G and B.

10. A color image reading and compensating device comprising:

image reading means including a color image sensor unit having three line sensors arranged in parallel and corresponding to at least three colors R, G, and B, each of said line sensors being formed of a number of pixels arranged in a line, said image reading means reading a color image for outputting a color image signal having a plurality of color signal components corresponding to the colors R, G, and B and forming a pixel;

first compensating means for compensating phase and resolution characteristics of the color image signal, by use of not only one color signal component selected from the color signal components of the color image signal but also the other color signal components, said one color signal component and said the other signal components being output from a pixel of interest and pixels near thereto;

conversion means for converting the color image signal output from said first compensating means into a plurality of color code signals corresponding to the colors R, G, and B forming of the color image; and second compensating means for converting a color code signal corresponding to a specific pixel into the other color code signal in accordance with a predetermined rule.

11. The color image reading and compensating device according to claim 10, wherein the line sensor corresponding to the color R has an aperture size larger than that of the line sensors corresponding to the remaining colors G and B.

* * * * *

UNITED STATES PATENT AND TRADEMARK OFFICE
CERTIFICATE OF CORRECTION

PATENT NO. : 5,315,413
DATED : May 24, 1994
INVENTOR(S) : Naofumi YAMAMOTO, et al.

It is certified that error appears in the above-indentified patent and that said Letters Patent is hereby corrected as shown below:

On the title page, Item [30], the 2nd Foreign Application Priority Data has been omitted and should read as follows:

--Mar. 31, 1992 [JP] Japan .................... 4-105838--

Signed and Sealed this

Thirtieth Day of August, 1994

Attest:

BRUCE LEHMAN

Attesting Officer

Commissioner of Patents and Trademarks